Feb. 13, 1951           C. W. GINTER           2,541,352
LUBRICATION APPARATUS AND CABINET
Filed May 19, 1947           5 Sheets-Sheet 1
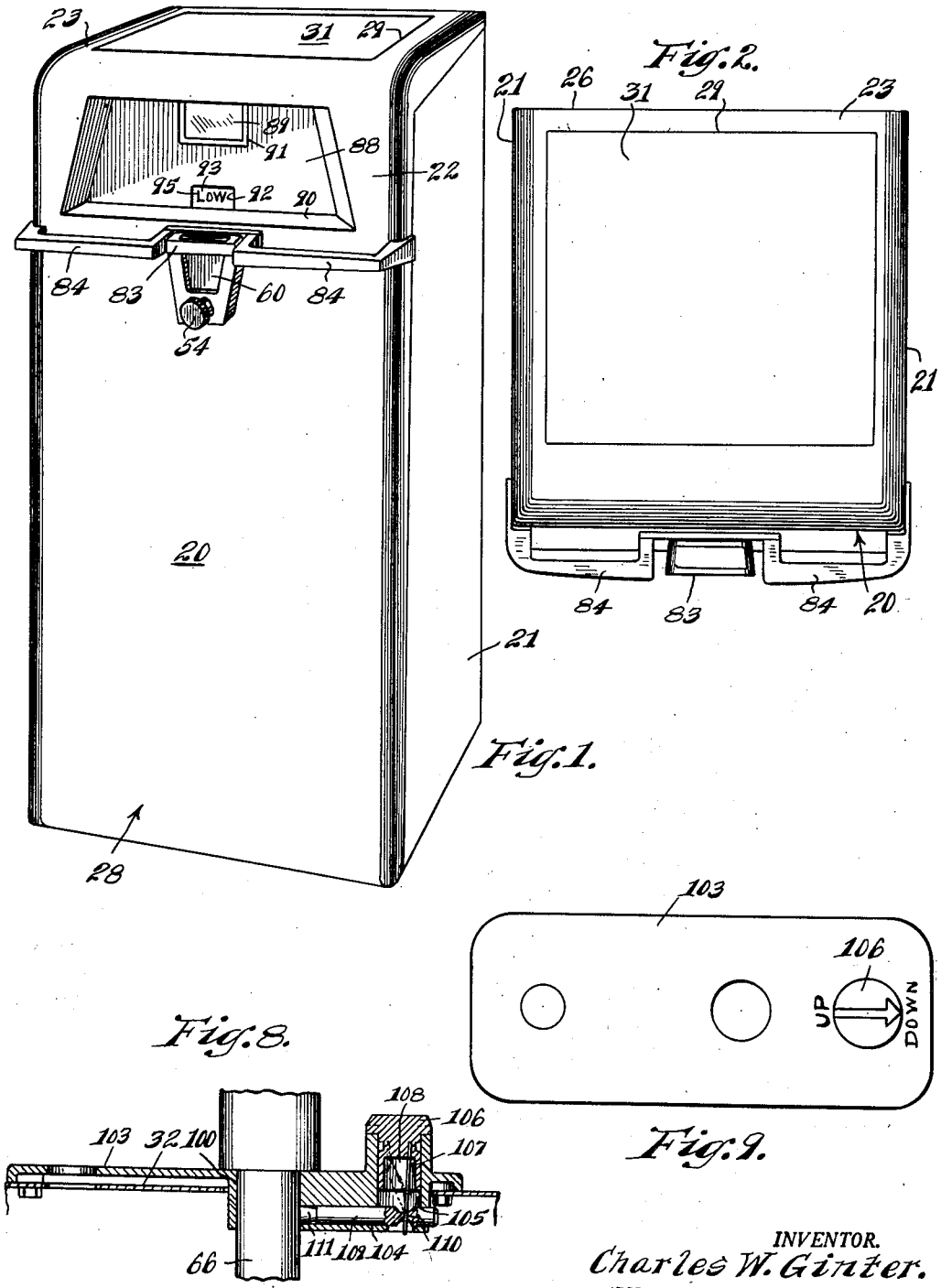
INVENTOR.
Charles W. Ginter.
BY Bair & Freeman
Attys.

Feb. 13, 1951 C. W. GINTER 2,541,352
LUBRICATION APPARATUS AND CABINET
Filed May 19, 1947 5 Sheets-Sheet 2

INVENTOR.
Charles W. Ginter
BY Bair & Freeman
Att'ys.

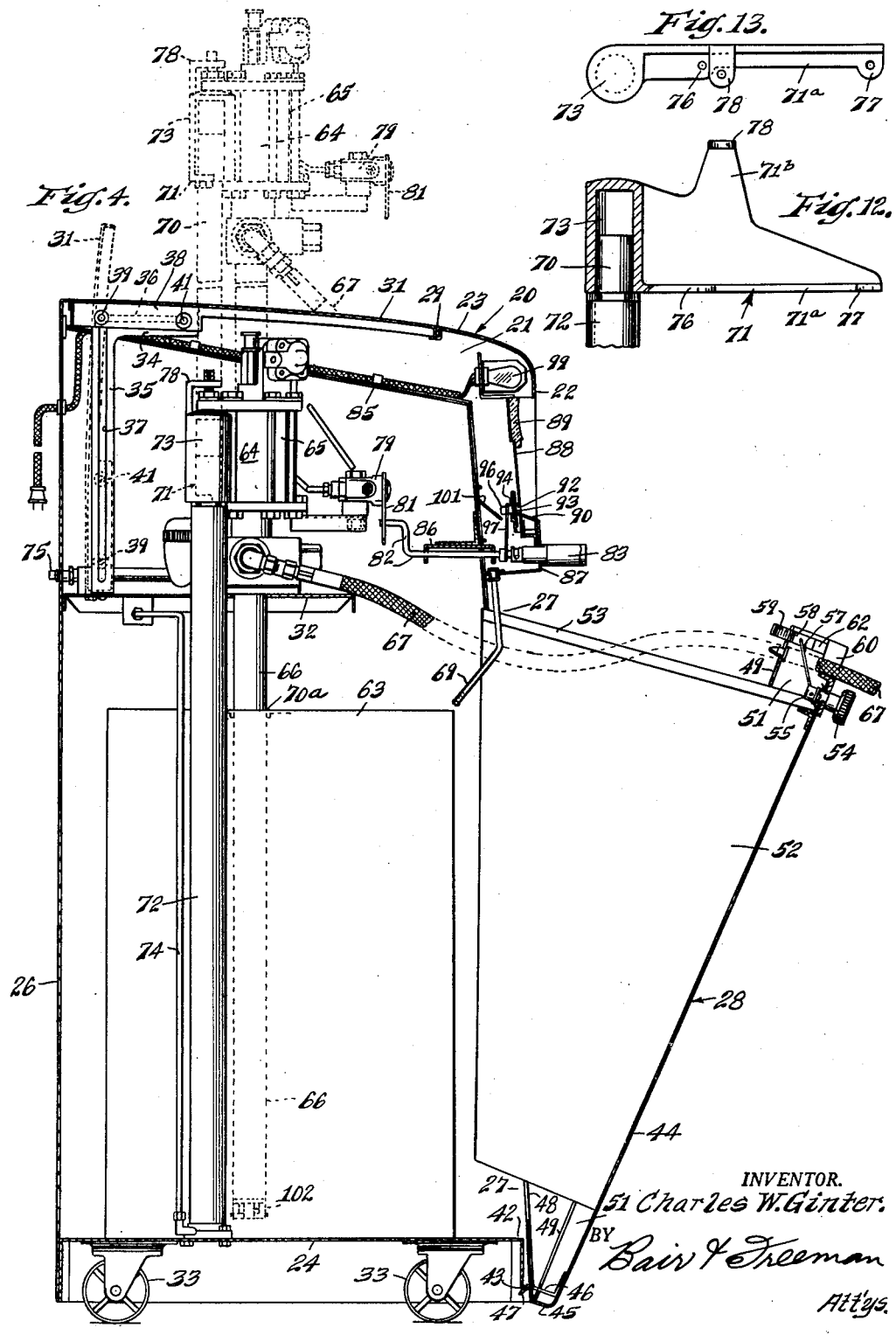

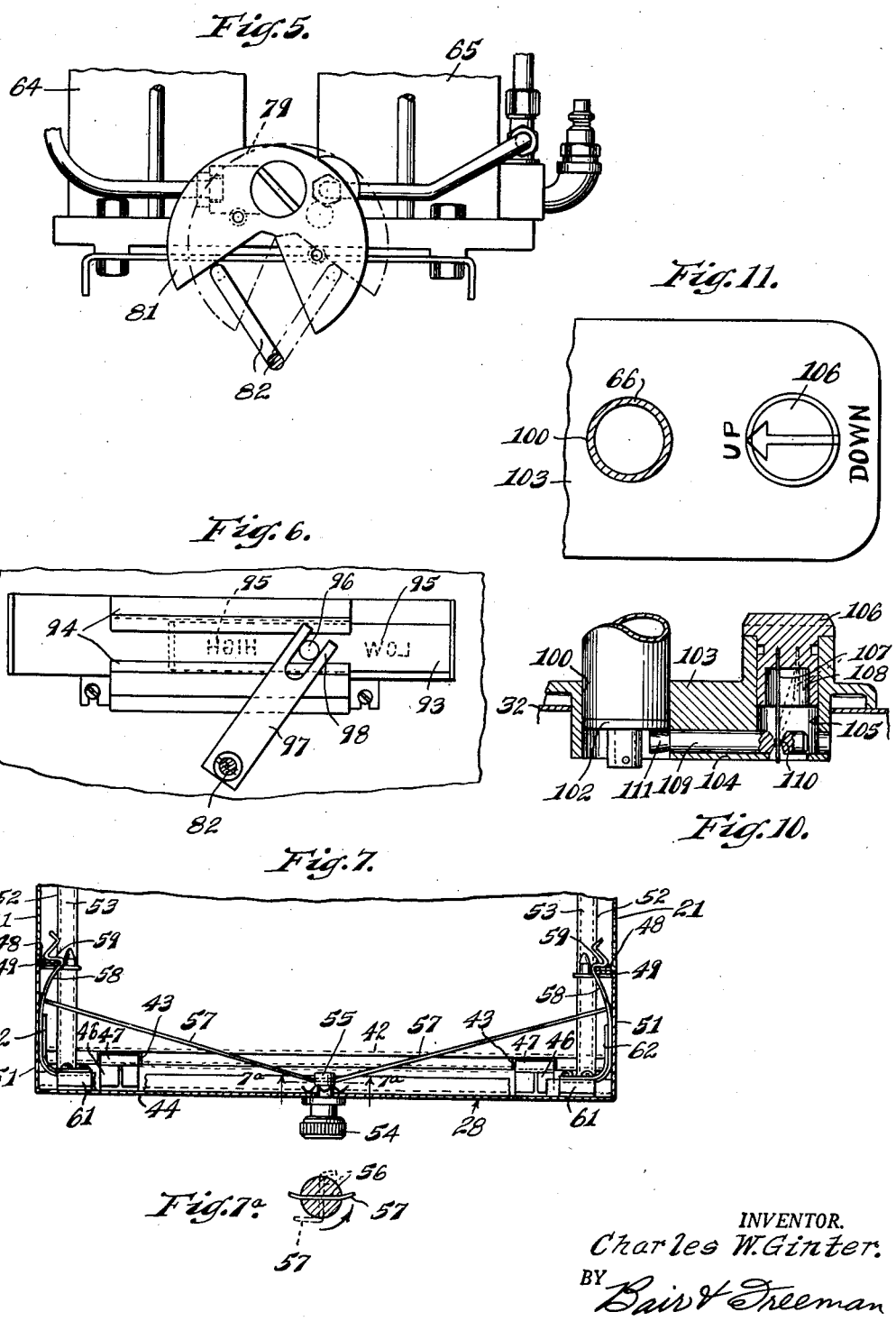

Feb. 13, 1951 C. W. GINTER 2,541,352
LUBRICATION APPARATUS AND CABINET
Filed May 19, 1947 5 Sheets-Sheet 5
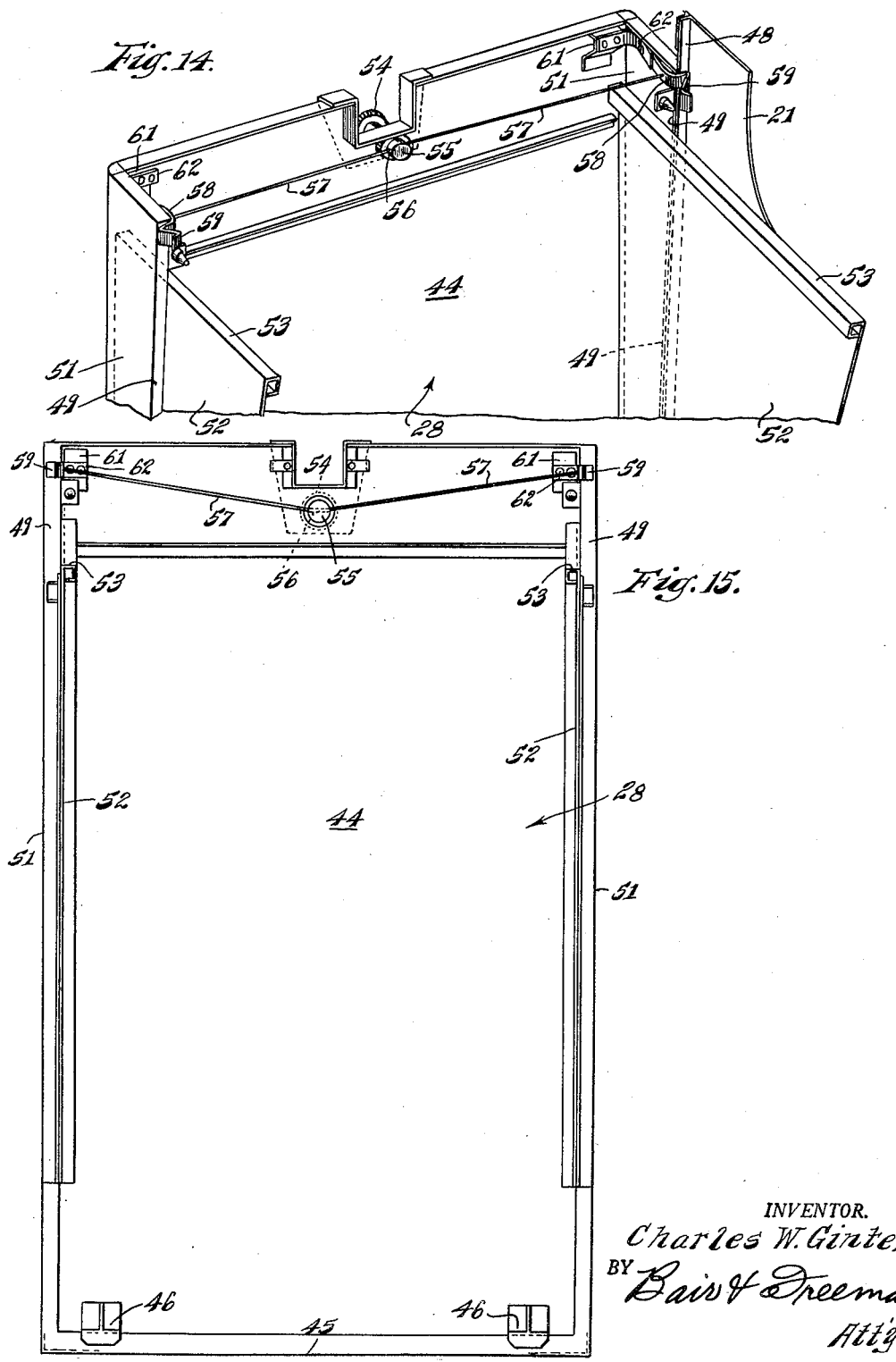
INVENTOR.
Charles W. Ginter.
BY Bair & Freeman
Attys.

Patented Feb. 13, 1951

2,541,352

UNITED STATES PATENT OFFICE 2,541,352

LUBRICATION APPARATUS AND CABINET

Charles W. Ginter, Bryan, Ohio, assignor to The Aro Equipment Corporation, Bryan, Ohio, a corporation of Ohio Application May 19, 1947, Serial No. 748,975

9 Claims. (Cl. 222—176)

This invention relates to lubrication apparatus and cabinet therefor and particularly to lubrication apparatus of the type generally utilized in garages and service stations.

It is an object of the invention to provide lubrication apparatus and a cabinet therefor which is pleasing in appearance and which provides for concealment of the barrel or container for the lubricant as well as the pumps, hose, fittings, etc., when not in use.

It is also an object of the invention to provide a lubrication apparatus of the totally enclosed type in which insertion and removal of the lubricant container is facilitated.

It is also an object of the invention to provide a lubrication apparatus of the totally enclosed type wherein pneumatic means are utilized for lifting the pumping means and associated parts from the lubricant container when replacement of the lubricant container is necessary.

It is also an object of the invention to provide a totally enclosed portable lubrication apparatus which may be moved from place to place or stationary lubrication apparatus for lubricating automotive vehicles.

It is a further object of the invention to provide a novel closure for a lubrication cabinet of the type described.

It is an additional object of the invention to provide a novel mechanism for operating a valve for the lubrication apparatus for controlling the delivery of high or low pressure lubricant from the pumping mechanism.

It is a further object of the invention to provide a novel means for retaining the pumping means and associated parts in raised position which is applicable primarily to manually liftable pump assemblies.

It is an additional object of the invention to provide very simple latching means for the front closure of a cabinet of the type described and also to provide for a simplified top closure member and operation thereof.

It is still another object of the invention to provide a lubrication cabinet for totally enclosing the lubrication equipment when not in use, which is formed of sheet metal, is relatively inexpensive in construction and which is exceptionally pleasing in appearance.

With these and other objects in view, the invention consists in the construction, arrangement and combination of the various parts of my device whereby the objects contemplated are attained, as hereinafter more fully set forth, pointed out in the claims and illustrated in the accompanying drawings, wherein:

Figure 1 is a perspective view of a lubrication cabinet illustrating the invention;

Figure 2 is a top plan view of the lubrication cabinet shown in Figure 1;

Figure 4 is a vertical sectional view of the lubrication cabinet and apparatus similar to Figure 3 and illustrates the cabinet with the front closure member open, the dotted lines showing the position of the top closure member and the pumps and associated parts when the pumps are raised for replacement of a lubricant container within the cabinet;

Figure 5 is a partial sectional view taken on line 5—5 of Figure 3;

Figure 6 is a partial sectional view taken on line 6—6 of Figure 3;

Figure 7 is a partial sectional view taken on line 7—7 of Figure 3;

Figure 7a is a partial sectional view taken on line 7a—7a of Figure 7;

Figure 8 is a sectional view of the device shown in Figure 9 illustrating the "down" or released position thereof;

Figure 9 is a top plan view of a device for retaining the pump in the raised position;

Figure 10 is a partial sectional view of the device shown in Figures 8 and 9 showing the parts in the up or retaining position thereof;

Figure 11 is a partial top plan view of the device shown in Figure 8 in the "up" or retaining position thereof;

Figure 12 is a partial detail view of the bracket and lifting member for the pumps;

Figure 13 is a top plan view of the bracket shown in Figure 12.

Figure 14 is a partial perspective view of the top of the front closure member looking at the rear thereof; and Figure 15 is a rear elevational view of the front closure member.

Figure 3:
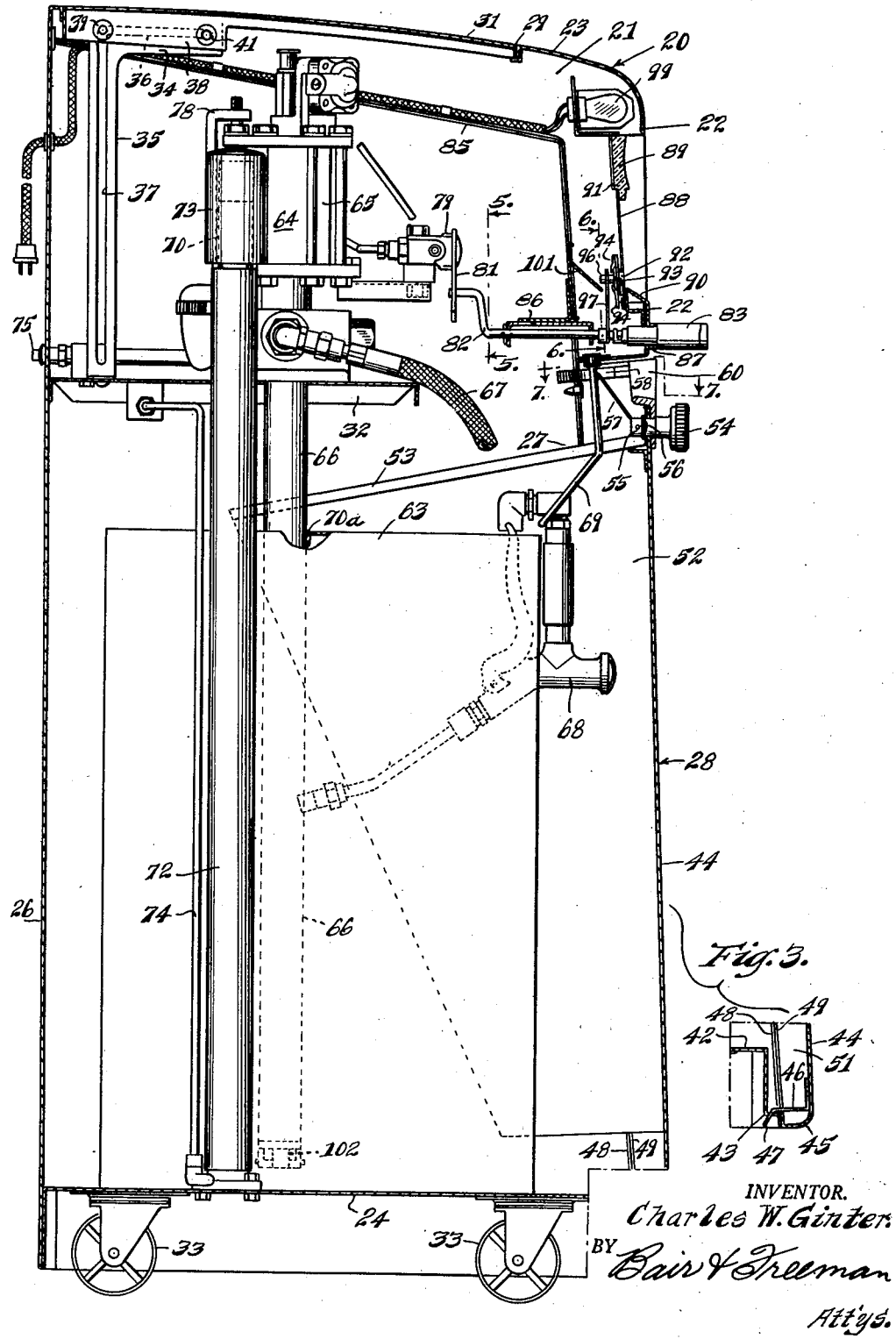
Figure 3 is a vertical sectional view of the lubrication cabinet and the apparatus contained therein, a small portion of the bottom front corner of the cabinet being shown in a separate small view for the sake of clarity.

Referring specifically to the drawings for a detailed description of the invention, numeral 20 designates generally a lubrication cabinet having side walls 21, a front wall 22, a top wall 23, a bottom wall 24, and a back wall 26. The lower portion of the front of the cabinet is provided with an opening 27 therein and a hinged door or closure member 28 is provided for the opening 27. The top wall 23 of the cabinet is provided with an opening 29 therein and a door or closure member 31 for the opening 29.

A horizontal supporting member 32 is disposed within the cabinet intermediate the top and bottom walls thereof and is secured to the rear wall 26. Wheels 33 are secured to the bottom wall 24 of the cabinet so that the cabinet may be easily moved from place to place.

A pair of L-shaped members comprising a horizontal portion 34 and a vertical portion 35 are secured to the top wall 23 of the cabinet adjacent the side walls 21 thereof. A horizontal slot 36 is provided in the horizontal portion 34 of the L-shaped members and a vertical slot 37 communicating with the horizontal slot 36 is provided in the vertically extending portion 35 of the L-shaped members. A pair of generally rectangular members 38 are secured to the upper closure member 31 and are each provided with a pair of spaced rollers 39 and 41 thereon. The rollers 39 and 41 are received in the slots 36 and 37 and are positioned in such a manner that the closure member 31 may be moved to the open position shown in dotted lines in Figure 4, whereupon the rollers 39 and 41 are both positioned in the slot 37 of the vertical member 35. When the closure member 31 is in the closed position, the roller 41 is located in the slot 36 in the member 34 and the roller 39 is positioned at the junction of the slots 36 and 37, as will be apparent from Figures 1 and 4.

As best shown in the small cut-out portion of Figure 3, a generally S-shaped panel member 42 is formed from the bottom wall 24 of the cabinet along the front edge thereof and extends downwardly therefrom to a position closely adjacent the floor level, thereby substantially concealing the wheels 33. The member 42 is provided with a pair of openings 43 at the lower bend of the S. The front closure member 28 includes an outer panel 44, which is curved at its bottom as shown at 45. Hinge members 46 having portions 47 which normally extend into the openings 43 in the member 42 are secured to the front panel 44 of the closure member 28. Inturned flanges 48 are formed at the front of the cabinet from the side walls 21 and inturned flanges 49 are formed on the closure member 28. As is best shown in Figure 7, the flanges 48 and 49 are in substantial contact with each other throughout their length when the closure member 28 is closed. The flanges 49 on the closure member 28 are bent inwardly from side panel members 51 of the closure member 28. Additional side cover members 52, which extend a considerable distance within the cabinet when the closure member 28 is closed are also formed from the front panel 44 of the closure member 28. An angle 53 is provided along the top of the side members 52 of the closure member 28 to impart rigidity thereto.

A knob 54 extends through the front of the closure member 28 and is provided with a shaft 55 having a groove 56 extending therethrough. A cable 57 extends through the groove 56 and is attached to a spring 58 on each side of the top of the closure member 28. The spring is attached to the closure member by means of angle members 61 and the cable 57 is in tension at all times. The spring 58 is provided with a reversely bent portion 59, which is adapted to engage the inner surface of the flanges 48 on the side walls 21 of the cabinet to retain the door in closed position. Stiffening springs 62 may also be secured to the front of the closure member by means of the angles 61 and engage the springs 58 to increase the rigidity thereof. It is obvious, when it is desired to open the closure member 28, that the knob 54 is turned, thus disposing the cable in the position shown in dotted lines in Figure 7a and shortening the cable. The springs 58 are therefore drawn inwardly and the portions 59 thereof clear the flanges 48 and permit the closure 28 to be rotated about the hinges 43, 47 at the bottom of the cabinet.

A barrel or container for lubricant is disposed within the lower portion of the cabinet 20, as shown in Figures 3 and 4, and is supported from the bottom wall 24 of the cabinet. A pair of pumps 64 and 65 are provided within the cabinet and are connected with a suction pipe 66, which extends downwardly within the cabinet. In the normal position of the suction pipe 66, it extends through an opening 70a in the top of the container 63 and is positioned so that the bottom of the pipe 66 is adjacent the bottom of the container 63.

A flexible hose 67 extends from the outlet of the pumps 64, 65 and may be coiled and stored within the cabinet 20 when the door 28 is closed. When the door 28 is open, as shown in Figure 4, the flexible hose 67 may pass through an aperture 69 in the front of the door 28. It is, therefore, possible to close the door 28 with the hose outside the door, if desired. The end of the hose is provided with a standard lubricating valve 68, to which various fittings may be attached, and a hook 69 is provided within the closure member 28 and is supported near the side of the cabinet so that the valve 68 may be hung thereon on one side of the lubricant container 63 when not in use.

The lubricant pumps 64, 65 are supported on a platform 71, which is adapted to rest on the partition 32 when the pumps are in their lowermost position. A pneumatic elevator, having a cylinder indicated at 72, extends downwardly within the cabinet and is supported on the bottom wall 24 thereof. The top 70 of the piston slidable in cylinder 72 extends into a socket 73 of the supporting member 71, so that movement of the piston will raise or lower the platform 71 and the pumps 64 and 65 together with their attendant parts. A source of supply of fluid under pressure, for example, compressed air, is supplied to the pumps 64 and 65 through a connection 75 for operating the pumps. A conduit 74 conveys compressed air to the bottom of the pneumatic elevator through a suitable adapter (not shown). A restricting valve (not shown) affords restricted escape of compressed air from the pneumatic elevator when it is to be lowered.

The supporting member 71 for the pumps 64, 65 and their attendant parts includes a horizontal portion 71a extending from the socket 73 and a vertical portion 71b, also extending from the socket 73. Ears 76 and 77 are provided on a horizontal member 71a, which ears have apertures therein for the reception of bolts which secure the pumps 64 and 65, respectively, to the supporting member 71. The vertical portion 71b of the supporting member 71 has an ear 78 provided thereon having an aperture through which a bolt may extend to secure the top of the pump assembly to the supporting member 71.

A valve 79 is provided on the pump assembly and is controlled by the position of a disc 81 which is notched at its lower portion. When the disc is moved to one position, such as the full line position shown in Figure 5, only one of the pumps 64, 65 delivers lubricant through the hose 67 at a relatively low pressure. When the disc 81 is turned to the dotted line position shown in Figure 5, both pumps 64 and 65 are effective to deliver lubricant at a higher pressure to the hose 67. Such a lubrication system, involving the use of two pumps and a suitable valve for controlling them, is well known in the art and further description is therefore unnecessary.

The notched disc 81 is moved to its two operating positions shown in Figure 5 by a crank 82 having a horizontal portion thereof extending into the notch of the disc 81 and freely engaging the side walls thereof. The crank 82 extends forwardly through the front wall 22 of the cabinet 20 above the closure member 28 and terminates in an exposed handle or knob 83. Decorative fixed handles 84 are provided on the front of the cabinet 20 to blend in with the handle 83 and to provide means which the operator may grasp to move the cabinet from place to place on the wheels 33.

Inner inturned flanges 85 are provided in the upper portion of the cabinet, as best shown in Figures 3 and 4, and a bearing member 86 is provided adjacent the lower portion thereof to provide a bearing support for the crank 82. The front of the cabinet 22 is provided with short outwardly turned flanges 87 to provide additional support for the crank 82 adjacent the handle 83.

A panel member 88 is disposed in back of the upper portion of the front wall 22 of the cabinet and a transparent block of light transmitting material 89 is disposed in an opening 91 formed adjacent the top of the panel 88. A lower opening 92 is also provided in the panel 88, through which a slidable indicator member 93 is visible. The member 93 slides in channels 94 and the indicator is provided with indicia 95 which may be perforated in the material of the slide 93. A pin or projection 96 is provided on the rear surface of the slide 93 and a member 97 having a forked end 98, which encompasses the pin 96, is keyed to the crank 82 and turns when the handle 83 is rotated to control the valve 79 for the delivery of either high or low pressure lubricant.

A source of light 99 is disposed adjacent the top of the cabinet above the light transmitting block 89 and transmits light through the block to the flange 90 on the front wall 22 of the cabinet and also to a reflector member 101 secured internally of the cabinet. The reflector 101 reflects light horizontally through the indicia 95 of the slide 93, which is visible through the opening 92 in the panel 88, depending upon the position of the handle 83. The block 89, panel 88, flange 90 and indicia 95 are, therefore, illuminated from the single source of light 99. The illumination apparatus is fully described and claimed in my copending application, Serial No. 738,482, filed March 31, 1947, for Lighting System for Lubrication Cabinets or the like.

The lubricant cabinet disclosed may be constructed without the pneumatic elevator 70, 72, in which case the construction is substantially the same except that lifting handles (not shown) are provided on the pump assembly which may be grasped to lift the pump assembly and the suction pipe 66 upwardly to the dotted line position shown in Figure 4. When a pneumatic elevator is utilized, the pump assembly will remain in its upper position so long as air pressure is supplied to the pipe 74. When the pump assembly is to be manually lifted, however, some means must be provided for retaining it in its upper position.

Such a means is shown in Figures 8 to 11, inclusive. This means comprises a relatively heavy plate 103 which is secured to the partition 32. The plate 103 has a vertical opening 100 therein, through which the suction pipe 66 slides. The suction pipe 66 is provided with a foot valve 102 at the bottom thereof, which forms a shoulder as best shown in Figure 10. The plate 103 is provided with a horizontal bore 104 and a communicating vertical bore 105. A knob 106 is contained in the vertical bore 105 and is rotatable therein. A spring member 107 is secured to the knob, off the center thereof and extends vertically downwardly through a recess 108 in the knob 106 and through the lower portion of the vertical bore 105.

A plunger 109 is slidably retained in the horizontal bore 104 and is provided with a vertical opening 110 at one end thereof, through which the spring 107 extends. The other end of the plunger 109 is provided with a reduced portion 111.

When the pump assembly 64, 65 and the suction pipe 66 are in their operating position, as shown in Figure 3, and it is desired to raise the suction pipe 66 from the container 63 to replace a container in the cabinet 20, the knob 106 is moved to the "up" position and the spring is positioned as shown in Figure 10. The tension of the spring tends to force the plunger 109 toward the suction pipe 66. When the suction pipe 66 is raised a sufficient distance to position the foot valve 102 above the plunger 109, the plunger will immediately snap inwardly and the reduced end 111 thereof will prevent the suction pipe 66 from dropping downwardly. When a new container 63 is put in place, the knob 106 is turned to the "down" position as shown in Figure 9, and the spring will assume the position shown in Figure 8. However, the plunger 109 will remain stationary because the spring 107 is not strong enough to overcome the frictional resistance between the extension 111 of the plunger and the shoulder of the foot valve 102. The pump assembly and the suction pipe 66 are then raised a small amount to disengage the foot valve 102 from the extension 111 and the spring will then immediately snap the plunger 109 back. The suction pipe may then be dropped through the opening 100 of the plate 103 and through the opening 70a of the container 63 until it is positioned in the container, as shown in Figures 3 and 4.

From the foregoing it will be apparent that when the container 63 is full or partially full, and it is desired to lubricate an automobile, the cabinet 20 is moved to the desired position and the front door 28 opened to gain access to the lubrication valve 68 and hose 67. As stated hereinbefore, if desired, the door 28 may then be closed with the hose 67 extending through the aperture 60 in the door 28. The handle 83 is then turned to the desired position to effect the delivery of either high or low pressure lubricant. After the lubrication job is finished, the hose 67 and valve 68 are again stored within the cabinet with the valve 68 on the hook 69 and the door 28 is again closed and is retained in the closed position by the spring 58 engaging the flanges 48 on the side walls of the cabinet.

If it is now desired to replace the lubricant container 63, the top cover 31 is disposed in the position shown in dotted lines in Figure 4. The pneumatic elevator 70, 72 is then operated to raise the pumps 64 and 65 and the suction pipe 66, or the assembly is manually lifted. The suction pipe 66 is positioned above the top of the container 63. It is also to be noted that the valve 79 is lifted with the pumps 64 and 65, the notched disc 81 permitting raising of the valve 79 from the crank 82.

The front door 28 is then swung to the open position and may be readily lifted off the hinges 43, 47. The entire door 28 is removed and the container 63 is slid outwardly from the front of the cabinet 20. A new container is then inserted in the cabinet and the compressed air is cut off the elevator, the restricting valve (not shown) permitting the suction pipe 66 to drop slowly into the container 63 through the opening 70a therein. The top cover 31 is then again closed and the door 28 replaced on the hinges 43, 47.

If the apparatus is not equipped with a pneumatic elevator, the pumps are raised and lowered manually in the manner explained above.

Some changes may be made in the construction and arrangement of the parts of my lubrication apparatus and cabinet without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In lubricating apparatus, a self-contained unit for dispensing liquid from a container comprising a cabinet having front, rear, side, bottom and top walls, an opening in the top wall, a movable top closure member for said opening, an opening at the front of the cabinet, a hinged closure member therefor affording access to a portion of the interior of the cabinet, means affording removal of said hinged closure member to permit removal and replacement of the lubricant container within the cabinet, a lubricant pump assembly normally disposed within the cabinet and including a suction tube adapted to extend into said lubricant container to a position adjacent the bottom thereof, and means affording raising of the pump assembly through said top opening and for positioning the suction tube above the top of the lubricant container after said top closure member is opened.

2. In lubricating apparatus, a self-contained unit for dispensing liquid from a container comprising a cabinet having front, rear, side, bottom and top walls, an opening in the top wall, a movable top closure member for said opening, an opening at the front of the cabinet, a hinged closure member therefor affording access to a portion of the interior of the cabinet, means affording removal of said hinged closure member to permit removal and replacement of the lubricant container within the cabinet, a lubricant pump assembly normally disposed within the cabinet and including a suction tube adapted to extend into said lubricant container to a position adjacent the bottom thereof, and means affording raising of the pump assembly through said top opening and for positioning the suction tube above the top of the lubricant container after said top closure member is opened, said last means including a pneumatic cylinder supported on the bottom wall of the cabinet.

3. In lubricating apparatus, a self-contained unit for dispensing liquid from a container comprising a cabinet having front, rear, side, bottom and top walls, an opening in the top wall, a movable top closure member for said opening, an opening at the front of the cabinet, a hinged closure member therefor affording access to a portion of the interior of the cabinet, means affording removal of said hinged closure member to permit removal and replacement of the lubricant container within the cabinet, a lubricant pump assembly normally disposed within the cabinet and including a suction tube adapted to extend into said lubricant container to a position adjacent the bottom thereof, means affording raising of the pump assembly through said top opening and for positioning the suction tube above the top of the lubricant container after said top closure member is opened, said last means including a pneumatic cylinder supported on the bottom wall of the cabinet, and a pneumatic piston in said cylinder connected to said pump assembly.

4. In lubricating apparatus, a self-contained unit for dispensing liquid from a container comprising a cabinet having front, rear, side, bottom and top walls, an opening in the top wall, a movable top closure member for said opening, an opening at the front of the cabinet, a hinged closure member therefor affording access to a portion of the interior of the cabinet, means affording removal of said hinged closure member to permit removal and replacement of the lubricant container within the cabinet, a lubricant pump assembly normally disposed within the cabinet and including a suction tube adapted to extend into said lubricant container to a position adjacent the bottom thereof, means affording raising of the pump assembly through said top opening and for positioning the suction tube above the top of the lubricant container after said top closure member is opened, valve means disposed within the cabinet for controlling the operation of the lubricant pump, means on the exterior of the valve for adjusting the position thereof, and means extending through the cabinet and terminating in an operating handle for controlling the position of the valve adjusting means, said valve adjusting means and said means extending through the front of the cabinet being freely engageable with each other and being disposed in such a manner that they are freely separable from each other when the pump assembly is raised.

5. In lubricating apparatus, a self-contained unit for dispensing liquid from a container comprising a cabinet having front, rear, side, bottom and top walls, an opening in the top wall, a movable top closure member for said opening, an opening at the front of the cabinet, a hinged closure member therefor affording access to a portion of the interior of the cabinet, means affording removal of said hinged closure member to permit removal and replacement of the lubricant container within the cabinet, a lubricant pump assembly normally disposed within the cabinet and including a suction tube adapted to extend into said lubricant container to a position adjacent the bottom thereof, means affording raising of the pump assembly through said top opening and for positioning the suction tube above the top of the lubricant container after said top closure member is opened, and means for maintaining the pump assembly in its raised position.

6. In lubricating apparatus, a self-contained unit for dispensing liquid from a container comprising a cabinet having front, rear, side, bottom and top walls, an opening in the top wall, a movable top closure member for said opening, an opening at the front of the cabinet, a hinged closure member therefor affording access to a portion of the interior of the cabinet, means affording removal of said hinged closure member to permit removal and replacement of the lubricant container within the cabinet, a lubricant pump assembly normally disposed within the cabinet and including a suction tube adapted to extend into said lubricant container to a position adjacent the bottom thereof, means affording raising of the pump assembly through said top opening and for positioning the suction tube above the top of the lubricant container after said top closure member is opened, and means for maintaining the pump assembly in its raised position, said last means comprising a spring pressed plunger which engages the suction tube adjacent the bottom thereof in one position to maintain the suction tube in its raised position, said plunger being biased away from the suction tube in another position to afford disengagement of the plunger and the bottom of the suction tube and subsequent lowering of the suction tube.

7. In lubricating apparatus, a self-contained unit for dispensing liquid from a container comprising a cabinet having front, rear, side, bottom and top walls, an opening in the top wall, a movable top closure member for said opening, an opening at the front of the cabinet, a hinged closure member therefor affording access to a portion of the interior of the cabinet, means affording removal of said hinged closure member to permit removal and replacement of the lubricant container within the cabinet, a lubricant pump assembly normally disposed within the cabinet and including a suction tube adapted to extend into said lubricant container to a position adjacent the bottom thereof, means affording raising of the pump assembly through said top opening and for positioning the suction tube above the top of the lubricant container after said top closure member is opened, said last means comprising a spring pressed plunger which engages the suction tube adjacent the bottom thereof in one position to maintain the suction tube in its raised position, said plunger being biased away from the suction tube in another position to afford disengagement of the plunger and the bottom of the suction tube and lowering of the suction tube, and manually operable means tending to bias the plunger toward the suction tube in one position thereof and tending to bias it away from the suction tube in another position thereof.

8. In lubricating apparatus, a self-contained unit for dispensing liquid from a container comprising a cabinet having front, rear, side, bottom and top walls, an opening in the top wall, a movable top closure member for said opening, an opening at the front of the cabinet, a hinged closure member therefor affording access to a portion of the interior of the cabinet, means affording removal of said hinged closure member to permit removal and replacement of the lubricant container within the cabinet, a lubricant pump assembly normally disposed within the cabinet and including a suction tube adapted to extend into said lubricant container to a position adjacent the bottom thereof, means affording raising of the pump assembly through said top opening and for positioning the suction tube above the top of the lubricant container after said top closure member is opened, and supporting means disposed within the cabinet above the lubricant container for supporting the lubricant pump when it is disposed in its lowered position.

9. In lubricating apparatus, a self-contained unit for dispensing liquid from a container comprising a cabinet having front, rear, side, bottom and top walls, an opening in the top wall, a movable top closure member for said opening, an opening at the front of the cabinet, a hinged closure member therefor affording access to a portion of the interior of the cabinet and having a notch at the top thereof, means affording removal of said hinged closure member to permit removal and replacement of the lubricant container within the cabinet, a lubricant pump assembly normally disposed within the cabinet and including a suction tube adapted to extend into said lubricant container to a position adjacent the bottom thereof, and a flexible discharge hose secured to said pump assembly, said discharge hose being of sufficient length to extend a conseiderable distance outside of said cabinet, said discharge hose being disposed entirely within the cabinet when not in use and being accessible upon opening of said hinged closure member, said discharge hose being adapted to pass through the notch of said front closure so that the front closure may be closed and the major portion of the discharge hose may be disposed externally of the cabinet when in use.

CHARLES W. GINTER.

REFERENCES CITED

The following references are of record in the file of this patent:

UNITED STATES PATENTS

| Number | Name | Date |
| --- | --- | --- |
| 197,115 | Frees | Nov. 13, 1877 |
| 332,417 | McKenzie | Dec. 15, 1885 |
| 540,535 | Chaffin | June 4, 1895 |
| 1,073,138 | Jones | Sept. 16, 1913 |
| 1,740,830 | Parker | Dec. 24, 1929 |
| 1,820,849 | Teller | Aug. 25, 1931 |
| 1,887,086 | Erickson | Nov. 8, 1932 |
| 2,101,702 | Crosley | Dec. 7, 1937 |
| 2,105,990 | Schultz | Jan. 18, 1938 |
| 2,192,862 | Eagley | Mar. 5, 1940 |
| 2,212,749 | Pellouch | Aug. 27, 1940 |
| 2,225,722 | Spieth | Dec. 24, 1940 |
| 2,236,095 | Ginter | Mar. 25, 1941 |
| 2,381,598 | Jones | Aug. 7, 1945 |

FOREIGN PATENTS

| Number | Country | Date |
| --- | --- | --- |
| 279,181 | Germany | Oct. 13, 1914 |